(12) United States Patent
Weiland

(10) Patent No.: US 9,428,089 B2
(45) Date of Patent: Aug. 30, 2016

(54) HEADREST

(71) Applicant: Holger Weiland, Amberg (DE)

(72) Inventor: Holger Weiland, Amberg (DE)

(73) Assignee: GRAMMER AG, Amberg (DE)

( * ) Notice: Subject to any disclaimer, the term of this patent is extended or adjusted under 35 U.S.C. 154(b) by 0 days.

(21) Appl. No.: 14/288,131

(22) Filed: May 27, 2014

(65) Prior Publication Data

US 2014/0361595 A1 Dec. 11, 2014

(30) Foreign Application Priority Data

Jun. 6, 2013 (DE) .................. 10 2013 009 469

(51) Int. Cl.
*B60N 2/48* (2006.01)

(52) U.S. Cl.
CPC ..... *B60N 2/4844* (2013.01); *B60N 2002/4897* (2013.01)

(58) Field of Classification Search
CPC ............................................. B60N 2002/4897
USPC ........................................................ 297/410
See application file for complete search history.

(56) References Cited

U.S. PATENT DOCUMENTS

| | | | | |
|---|---|---|---|---|
| 3,512,833 A | * | 5/1970 | Sugiura | 297/410 |
| 3,563,602 A | * | 2/1971 | Ohta et al. | 297/410 |
| 4,483,565 A | * | 11/1984 | Terui et al. | 297/410 |
| 4,545,618 A | * | 10/1985 | Kitamura | 297/410 |
| 4,844,545 A | * | 7/1989 | Ishii | 297/410 |
| 6,012,777 A | * | 1/2000 | Wege et al. | 297/410 |
| 6,126,238 A | * | 10/2000 | Klindworth | 297/410 |
| 7,044,556 B1 | * | 5/2006 | Yetukuri et al. | 297/410 |
| 7,600,818 B2 | * | 10/2009 | Ebbeskotte et al. | 297/408 |
| 2004/0145228 A1 | * | 7/2004 | Terrand et al. | 297/410 |
| 2005/0280305 A1 | * | 12/2005 | Gurtatowski et al. | 297/410 |
| 2006/0061188 A1 | * | 3/2006 | Locke et al. | 297/410 |
| 2006/0103216 A1 | * | 5/2006 | Hoekstra et al. | 297/410 |
| 2006/0214491 A1 | * | 9/2006 | Metz et al. | 297/410 |
| 2008/0048479 A1 | * | 2/2008 | Yoshida et al. | 297/410 |
| 2009/0184557 A1 | * | 7/2009 | Runde | 297/410 |
| 2011/0291456 A1 | * | 12/2011 | Poehlmann et al. | 297/410 |

FOREIGN PATENT DOCUMENTS

| | | |
|---|---|---|
| DE | 102010055380 A | 6/2012 |
| DE | 102011008692 A | 7/2012 |

* cited by examiner

*Primary Examiner* — Timothy J Brindley
(74) *Attorney, Agent, or Firm* — Andrew Wilford

(57) ABSTRACT

A vehicle headrest has a support rod extending along an axis formed with a plurality of radially open notches, a head support carried above the notches on the support rod, and a guide sleeve mountable in a seat back and slidably receiving the support rod. An actuation element can shift axially on the sleeve between an actuated position and an unactuated position. An elongated and longitudinally incompressible latch element has an outer end shiftable radially and engageable in the notch and an inner end engaging the actuation element and shiftable axially on the sleeve on movement of the actuation element from the actuated position to the unactuated position between a latching position with the outer end engaged radially in one of the notches and securing the rod against movement in the sleeve and a release position with the outer end clear of the notches and permitting such movement.

9 Claims, 6 Drawing Sheets

HEADREST

FIELD OF THE INVENTION

The invention relates to a headrest.

BACKGROUND OF THE INVENTION

Such a headrest comprises a head support that is carried on an motor-vehicle seat by at least one support rod. At least one guide is attached to the structure of the backrest and forms a guide passage in which the support rod is moveable. To lock the movement of the support rod relative to the guide, the headrest comprises a latch.

The latch is provided with a latch element that can be moved in detachable engagement with the notch. The support rod is immovably locked in the guide passage when the latch element is engaged with the notch in a latching position and is movable in the guide passage when the latch element is disengaged from the notch in a release position.

DE 10 2010 055 380 A1 describes a latch for a headrest in which a spring arm on which the latch element of the latch is held is elastically deformed between a latching position and a release position.

OBJECT OF THE INVENTION

It is the object of the invention to provide a headrest having a latch in which the site of actuation of the latch is removed from the latch and the transfer of the movement of the actuating device to the latch can be freely adapted to the design-engineering requirements.

SUMMARY OF THE INVENTION

The object is attained by a headrest whose latch element is held on a device that can transmit compression forces and that is at least partly displaceable linearly relative to the guide during movement between the latching position and the release position.

In the headrest according to the invention, the latch is held on a force-transmitting device. The force-transmitting device transmits compression forces or, alternatively, compression and traction forces from the actuation of the latch to the latch, and the force-transmitting device can be displaced in part or overall relative to the guide on movement between the latching position and the release position.

One embodiment is characterized in that the force-transmitting device, on movement between the latching position and the release position, can be displaced at least in part in a direction that is parallel to its longitudinal midline. The longitudinal midline of the force-transmitting device can have straight and/or curved sections. During movement, the force-transmitting device is deformed.

Compression forces or, alternatively, compression and traction forces can be transmitted by the force-transmitting device. On movement between the latching position and the release position, the force-transmitting device is displaced linearly. The force-transmitting device has, for example, at least one deformable element. The force-transmitting device can also comprise a plurality of elements whose positions relative to each other can be changed. For instance, the force-transmitting device can comprise bodies that are loosely in contact, such as balls, for example, or bodies that are connected to each other, such as a chain, for example.

The deformable element can be formed for example by a chain guided such that compression forces can be transferred.

The force-transmitting device has, for example, at least one deformable element that is formed by a wire or by a plastic part. The deformable element can be elongated, for example, with the latch being held on an end and another end being formed as an actuation region. The deformable element can be integrally formed with the latch. The latch can connect two deformable elements to each other, for example. For instance, the latch is part of a clip that is integrally formed with two legs.

The force-transmitting device can be moved along a travel path, for example. In terms of the invention, this means that the force-transmitting device can be moved in linearly on a straight or a curved path or on a path that has straight and curved sections. The force-transmitting device has the characteristic of being able to flexibly adapt to the travel path.

According to one embodiment of the invention, guide surfaces are formed on the guide on which the force-transmitting device is guided. If the force-transmitting device is relatively inflexible, guides can be provided in intervals along the travel path, for example, so that the force-transmitting device is guided on the travel path. If the force-transmitting device is rather flexible, it is guided completely by guide surfaces, for example. The guide surfaces are part of a guide passage, for example.

The latch element is loaded into the latching position, for example, by a return element such as a spring.

According to one embodiment of the invention, the deformable element has an elastic return force. By virtue of the return force, the deformable element can be supported on the guide surfaces such that it moves automatically from the release position or from the intermediate positions between the release position and the latching position into the latching position.

The latch, particularly the force-transmitting device, can be adjusted between the latching position and the release position by an actuator, for example. On movement of the actuator between an unactuated and an actuated position, the force-transmitting device is displaced, for example, between the latching position and the release position. The actuator can comprise a pivoting or sliding handle, for example.

According to one embodiment, the actuator is associated with seat trim of the guide. The seat trim can have a cavity, for example, in which the actuator is received at least partly.

BRIEF DESCRIPTION OF THE DRAWING

Additional advantages of the invention follow from an embodiment shown in the figures.

SPECIFIC DESCRIPTION OF THE INVENTION

The headrest overall is designated at 10 in the figures. The same reference symbols in the various figures refer to corresponding parts even if lowercase letters have been added or omitted.

Figure 1:
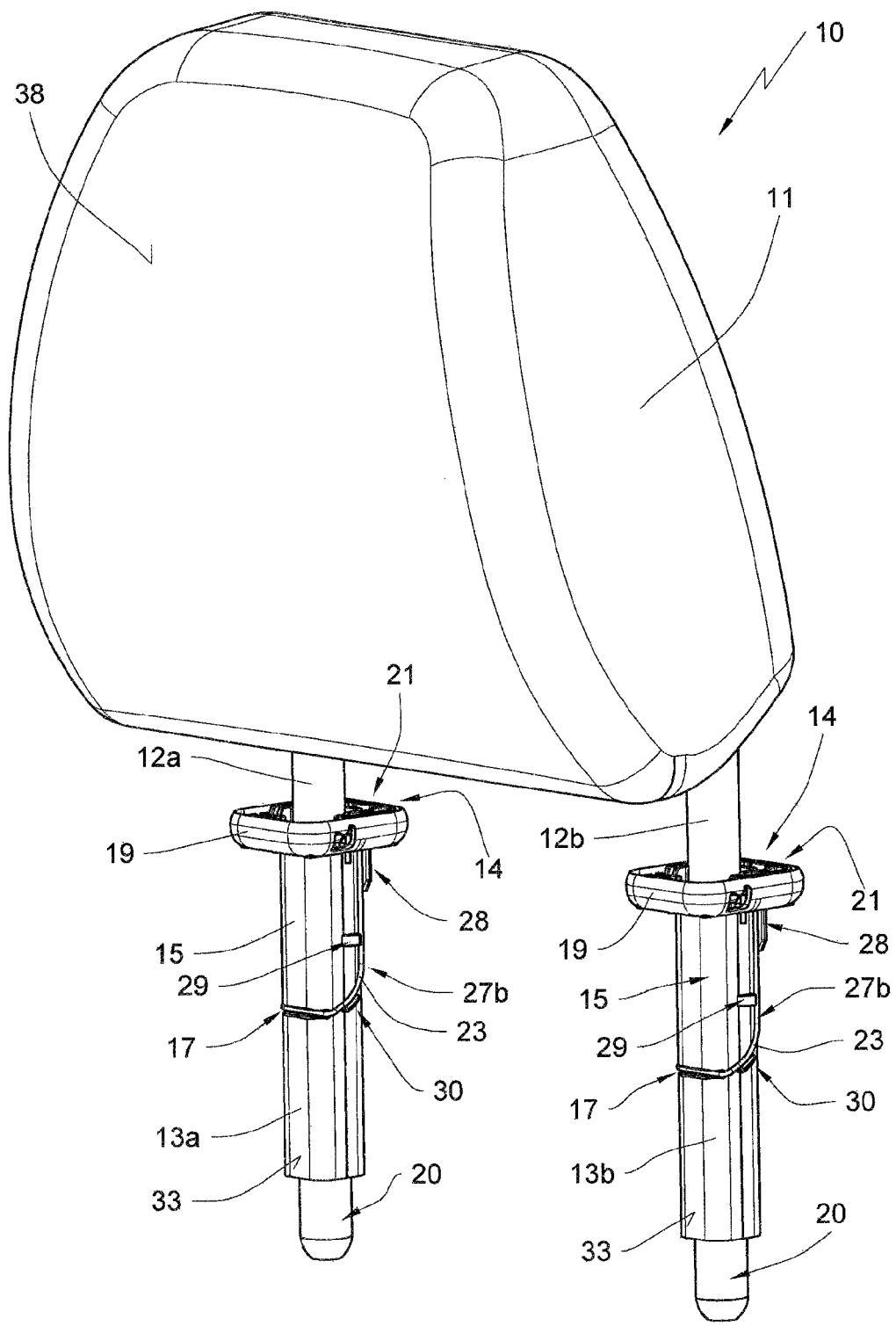
FIG. 1 is a schematic perspective view of a headrest with head support, support rods and a guide.

FIG. 1 shows the headrest 10 that can be attached to an unillustrated automobile seat in a manner that is not shown. According to FIG. 1, the headrest 10 comprises a head support 11, support rods 12a and 12b, guides 13a and 13b and a latch 14.

The head support 11 is provided with a cushion that forms a head support surface 38. The head support 11 is held on the two support rods 12a and 12b. The support rod 12a and 12b are supported in the guides 13a and 13b. Each guide 13a and 13b has a guide sleeve 15. The guide sleeve 15 projects through an opening in the unillustrated cushion of an unillustrated backrest of the automobile seat into the interior of the automobile seat and is attached to a frame of the automobile seat (not shown). An end 20 of each support rod 12a and 12b is moveably supported in a guide passage 16 of the respective guide sleeve 15 (see FIG. 2).

Figure 2:
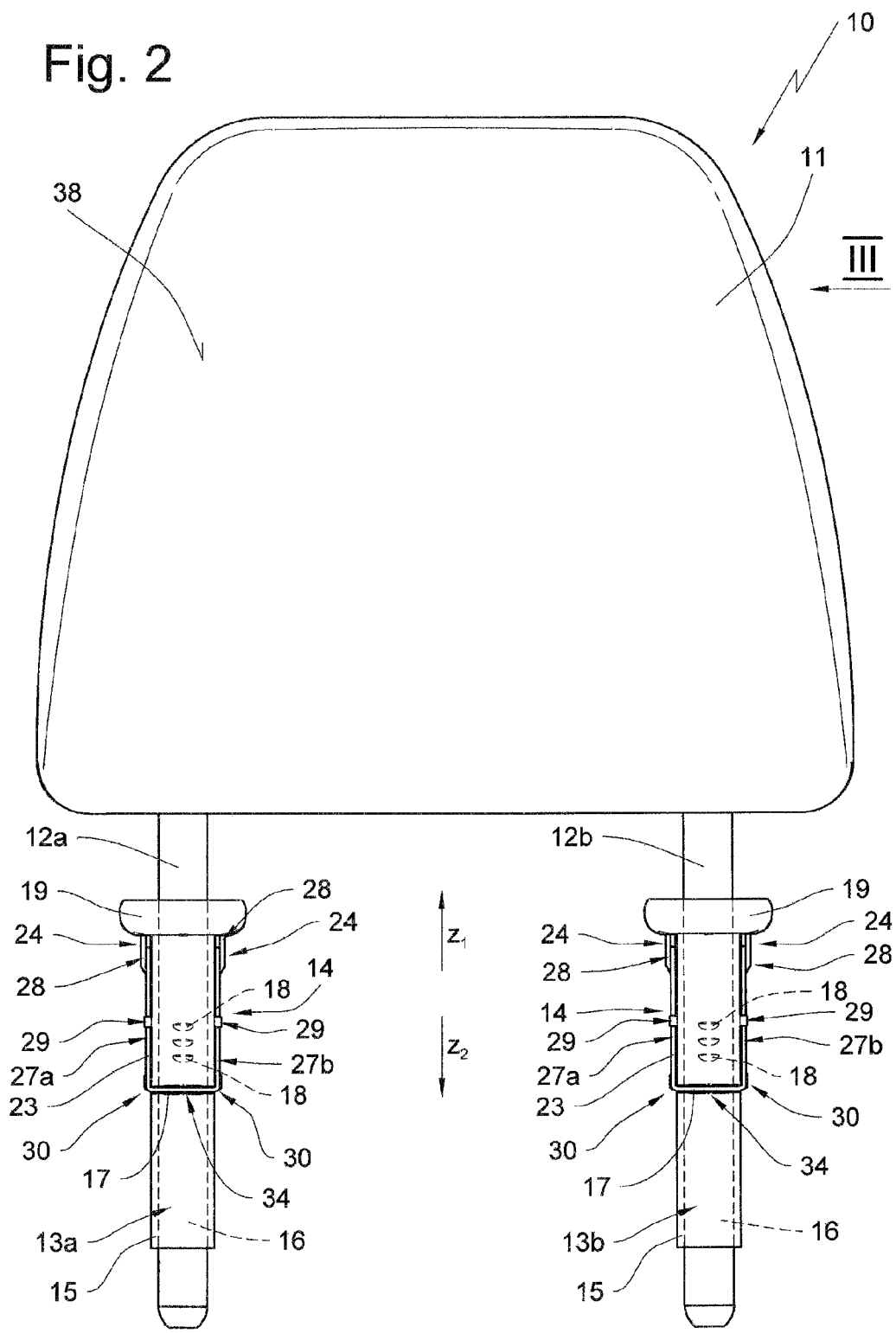
FIG. 2 is a schematic front view of the headrest.

The latch 14 (see FIG. 2) can secure the respective support rod 12a or 12b at the set height position relative to the respective guide sleeve 15. Each latch 14 has a latch element 17 that can engage in notches 18 of the respective support rod 12a or 12b. In FIG. 2, three notches are drawn in only schematically at each end of the support rods 12a and 12b. Of course, more or fewer than three notches 18 can also be provided along the longitudinal axis of the support rod 12a and 12b, respectively.

If the latch element 17 is engaged with one of the notches 18 (latching position of the latch element), the support rod 12a and the support rod 12b can no longer move relative to the respective guide sleeve 15 in direction $z_1$ or $z_2$. If the latch element 17 is not engaged with one of the notches 18 (release position of the latch element), the support rod 12a and the support rod 12b can moved relative to the respective guide sleeves 15 in directions $z_1$ and $z_2$.

The latch element 17 is formed as part of an elastic element 23. In the present illustrated embodiment, the elastic element 23 is formed as a spring wire. According to FIG. 2, each elastic element 23 has two legs 27a and 27b. In the present illustrated embodiment, the latch element 17 integrally formed with the legs 27a and 27b. According to one alternative, however, the latch element 17 could also be attached to the legs 27a and 27b.

Figure 3:
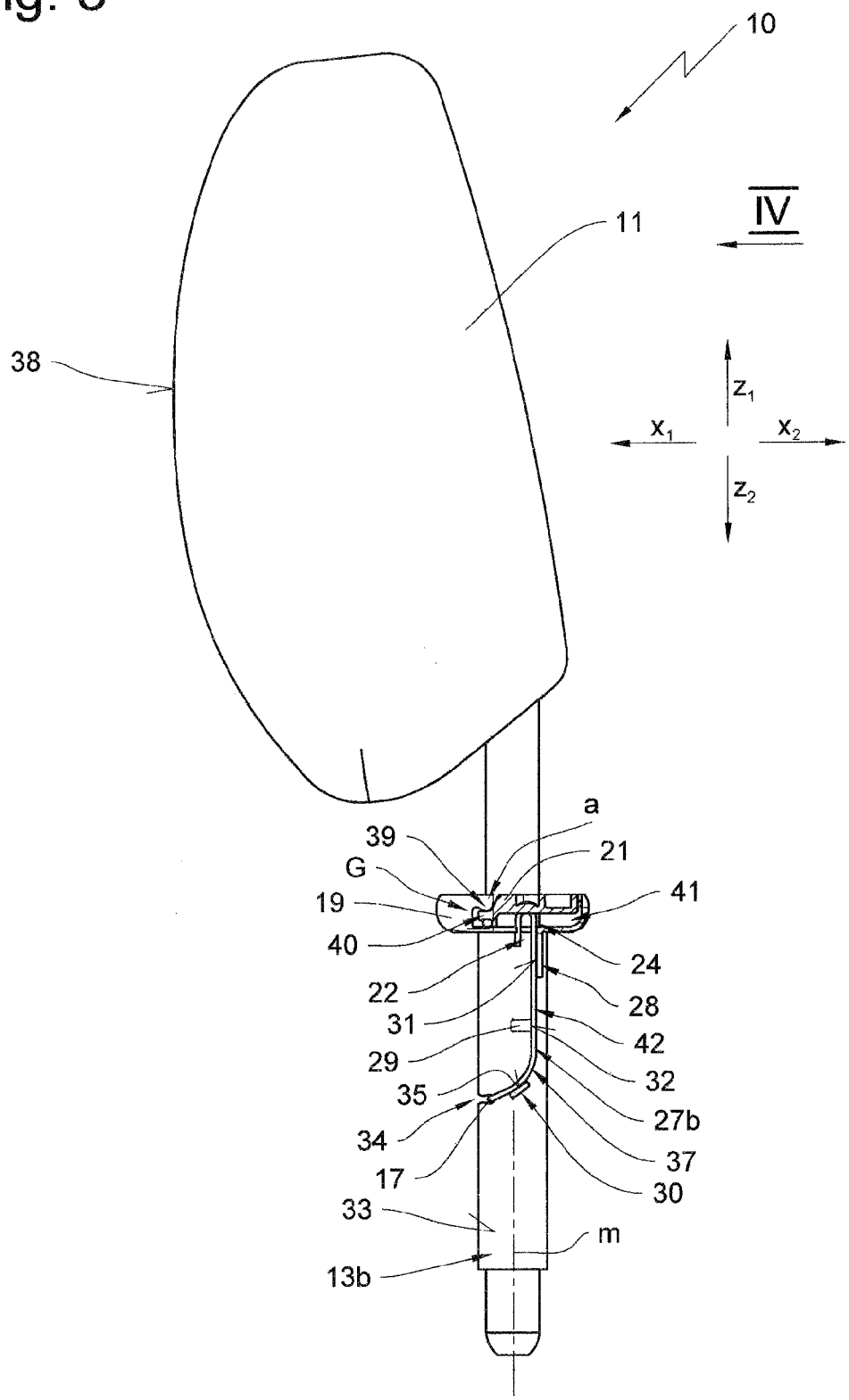
FIG. 3 is a schematic side view of the headrest according to view arrow III in FIG. 2, with the guide of the headrest being shown partly in section.

FIG. 3 shows that the leg 27b is formed with a U-shaped actuation region 24. In a corresponding embodiment, the leg 27a also has an actuation region 24 on its end.

Each guide 13a and 13b also has a seat trim 19. The seat trim 19 is attached to the guide sleeve 15. It rests on the outside on the upholstery of the automobile seat and covers the edge area of a hole in the upholstery.

Figure 5:
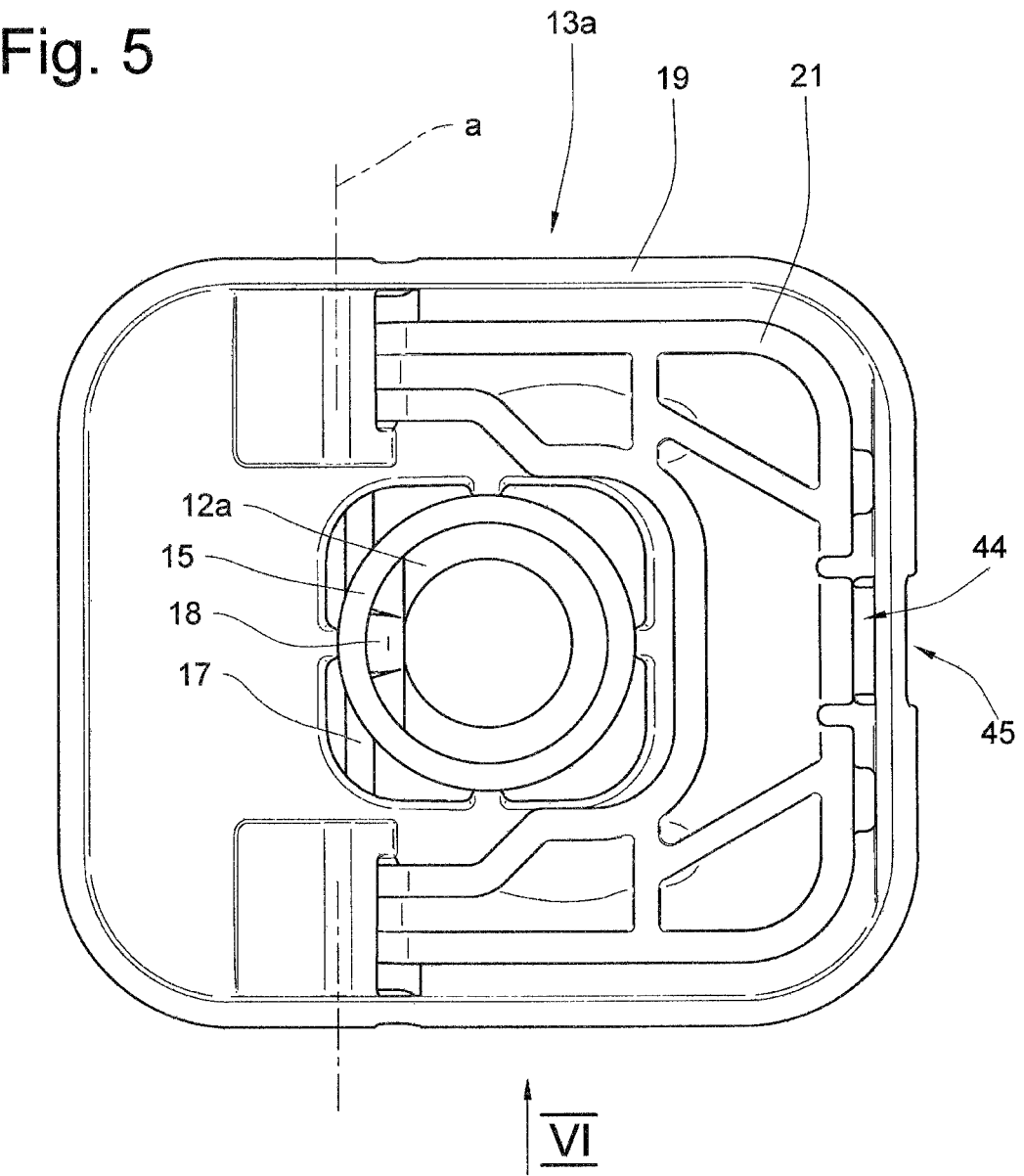
FIG. 5 is a schematic top view of the guide according to section line V-V of FIG. 4.

The seat trim 19 is bowl-shaped and has a cavity 41 in which an actuator 21 for operating the latch element 17 is received. In this example, the actuator 21 is a lever. The actuator 21 is pivoted on the seat trim 19. A pivot G between the seat trim 19 and the actuator 21 is formed by a recess formation 39 of the seat trim 19 and a projecting formation 40 of the actuator 21. The formations 39 and 40 form the pivot. In this way, the actuator 21 can pivot about a pivot axis a (see FIGS. 3 and 5).

The seat trim 19 is provided with a cutout 22 through which the actuation region 24 of the elastic element 23 projects. The actuation region 24 has a convex contact surface 25 that is formed by the U-shaped bent end. The contact surface 25 is in contact with a concave actuation face 26 of the actuator 21.

Each leg 27a and 27b of the elastic element 23 is guided by projecting formations 28, 29 and 30 of the guide sleeve 15a. The projecting formations 28, 29 and 30 are on both sides of each guide sleeve 15. The formations 28, 29 and 30 project from an outer surface 33 of the guide sleeve 15. The projection 28 forms a guide surface 31 by means of which the elastic element 23 is supported in a direction $x_1$. The projection 29 forms a guide surface 32 by means of which the elastic element 23 is supported in a direction $x_2$. The projection 30 forms a guide surface 35 by means of which the elastic element 23 is supported in the direction $x_1$ and in the direction $z_1$.

A straight region 42 of each leg 27a and 27b extends from the actuation region 24 approximately parallel to a middle axis m of the guide sleeve 15 downward along the outer surface 33. A bent region 37 extends from the region 42. With the straight region 42 and the bent region 37 bridge the path between the actuation surface 26 and a recess 34 in the guide sleeve 15. The region 42 rests against the guide surfaces 31 and 32, and the bent region 37 rests against the guide surface 35.

The recess 34 is formed in the wall of the guide sleeve 15a and opens radially into the guide passage 16. The latch element 17 is able to engage in the guide passage 16 through the recess 34.

Figure 4:
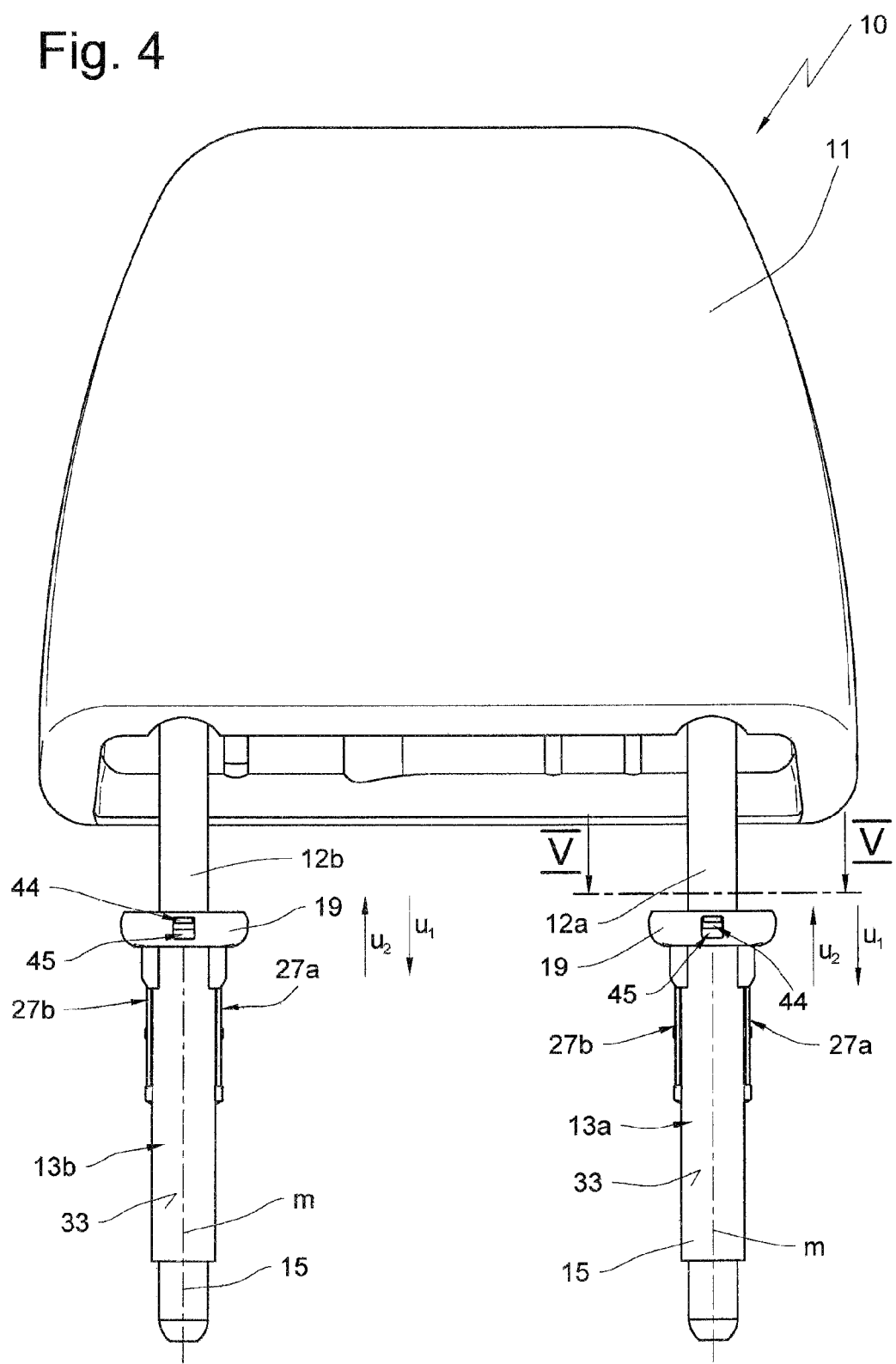
FIG. 4 is a schematic rear view of the headrest according to view arrow IV in FIG. 3.

The actuator 21 has an extension 44 that projects in a manner not shown from an opening 45 of the seat trim 19 and can be actuated from outside the seat trim 19 (see FIG. 4). When the actuator 21 is pivoted out of the rest position shown in FIG. 6 into the actuated position shown in FIG. 7, the actuation surface 26 exerts a force in the direction $z_2$ onto the contact surface 25, as a result of which the elastic element 23 is displaced in the direction $z_2$. The region 42 moves approximately parallel to the middle axis m in the direction $z_2$.

The guide surface 35 diverts a portion of the force acting in the direction $z_2$ into the direction $x_1$, as a result of which each leg 27a and 27b is displaced along a travel path 43 (indicated by a broken line next to the elastic element 23) and deforms elastically. The latch element 17 is moved radially in the direction $x_1$ out of engagement with the notch 18.

Figure 6:
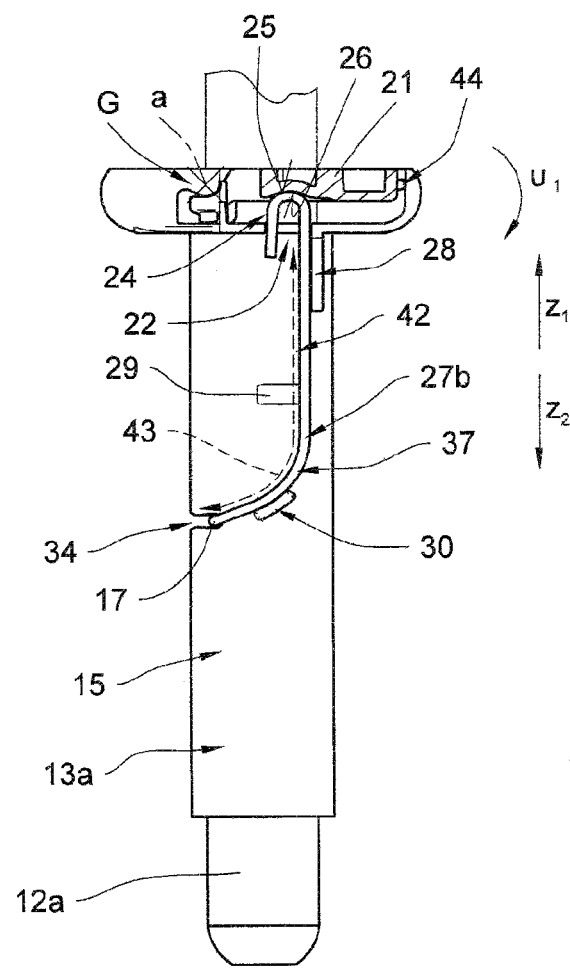
FIG. 6 is a partially sectional schematic side view of the guide and of the support rod, according to view arrow VI in FIG. 5, with the support rod only being partly shown and with the latch being in the unactuated position.
Figure 7:
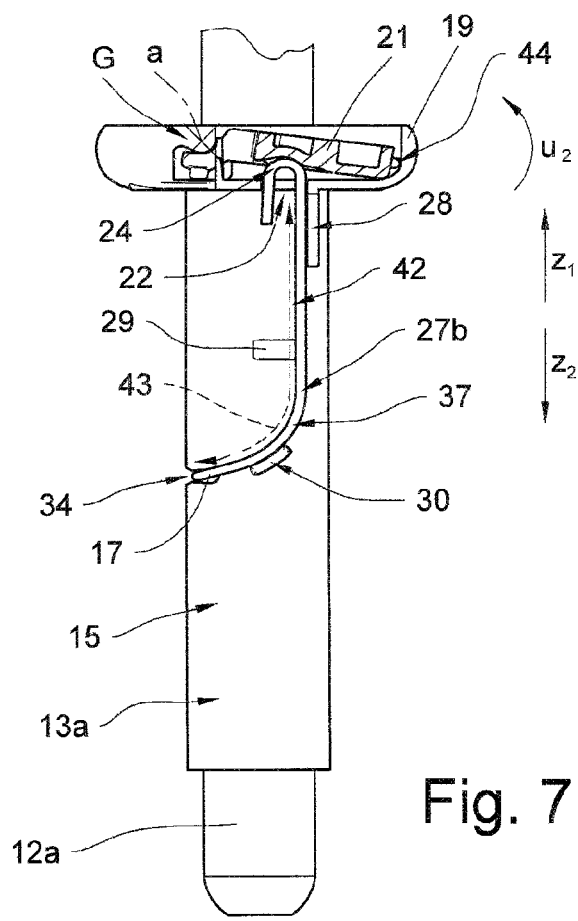
FIG. 7 shows as in FIG. 6 a partially sectional schematic side view of the guide, with the latch being in the actuated position.

On movement of the actuator 21 out of the rest position according to FIG. 6 in a pivot direction $u_1$ into the actuated position according to FIG. 7, the latch element 17 is moved out of the latching position according to FIG. 6 in the direction $x_1$ out of the notch 18 and into the release position according to FIG. 7. The ends 20 of the support rods 12a and 12b can then be moved in the guide passages 16 in the direction $z_1$ or $z_2$. As soon as the force on the actuator 21 is released, the elastic element 23 moves due to its return force back into the starting position according to FIG. 6 (latching position), and the actuator 21 is pivoted out of the actuated position in the pivot direction $u_2$ into the unactuated position.

The invention claimed is:
1. A headrest comprising:
a head support;
at least one support rod extending along a rod axis on an automobile seat, carrying the head support, having an end, and formed with a laterally open notch;

a guide attachable to the automobile seat and having a guide passage in which the rod end is movable;

a flexible metal or plastic latch wire radially movable on the rod and detachably engageable with the notch, the latch wire being engaged with the notch in a latching position and disengaged from the notch in a release position;

an actuating device movable between a non-actuated position and an actuated position for displacing the latch wire between the latching position and the release position, the latch wire being at least partially displaceable linearly to transmit compression forces for shifting the latch wire into the release position on movement of the actuating device into the actuated position;

at least one guide surface on the guide for deflection of the latch wire radially.

2. The headrest defined in claim 1, wherein the latch wire is elastic.

3. The headrest defined in claim 1, wherein the latch wire can be moved along a travel path.

4. The headrest defined in claim 3, wherein the guide is formed with a plurality of guide surfaces that define the path on which the latch wire can move.

5. The headrest defined in claim 4, wherein the actuating device is associated with seat trim of the guide.

6. The headrest defined in claim 1, wherein the latch wire has an elastic return force.

7. The headrest defined in claim 1, wherein compression and traction forces can both be transmitted by the latch wire.

8. A headrest comprising:

a head support;

at least one support rod extending along a rod axis on an automobile seat, carrying the head support, having a rod end, and formed with a radially outwardly open notch;

a guide attachable to the automobile seat and having a guide passage in which the rod end is movable;

a flexible metal or plastic latch wire movable radially of the rod and detachably engageable with the notch, the latch wire being engaged with the notch in a latching position and disengaged from the notch in a release position; and an actuating device movable between a non-actuated position and an actuated position for displacing the latch wire between the latching position and the release position, the latch wire being at least partially displaceable linearly to transmit compression forces for shifting into the release position on movement of the actuating device into the actuated position;

at least one guide surface on the guide for deflection of the latch wire radially.

9. A headrest comprising:

a head support at least one support rod extending along a rod axis on an automobile seat, carrying the head support, having a rod end, and formed with a laterally open notch, a guide attachable to the automobile seat and having a guide passage in which the rod end is movable;

a flexible U-shaped metal or plastic latch wire radially movable on the rod, having two ends and a latch portion between the ends, and detachably engageable with the notch, the latch wire being engaged with the notch in a latching position and disengaged from the notch in a release position;

an actuating device movable between a non-actuated position and an actuated position for displacing the latch wire between the latching position and the release position, the latch wire being at least partially displaceable linearly on the guide to transmit compression forces for shifting the latch portion into the release position on movement of the actuating device into the actuated position;

at least one guide surface on the guide for deflection of the latch wire radially.

\* \* \* \* \*